Aug. 31, 1926.

J. L. PARKER

EDUCATIONAL DEVICE

Filed Jan. 11, 1926    2 Sheets-Sheet 1

Inventor
J. L. Parker.

By Clarence A. O'Brien
Attorney

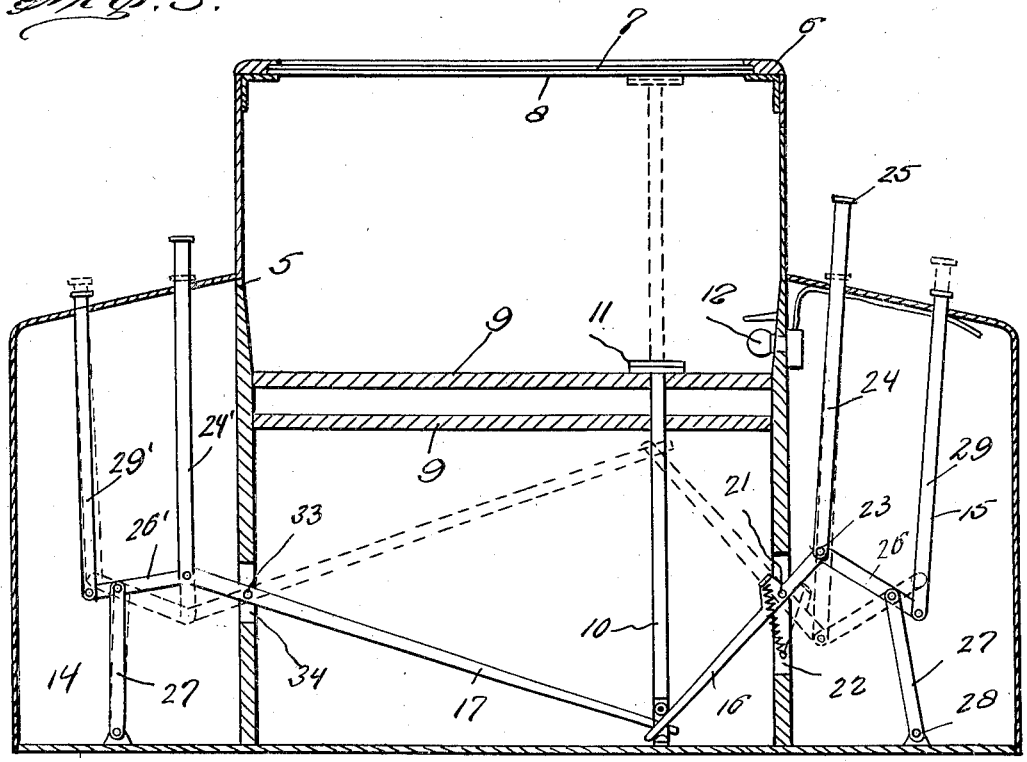
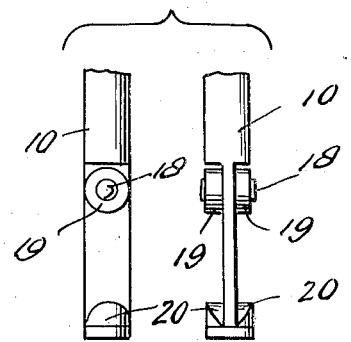
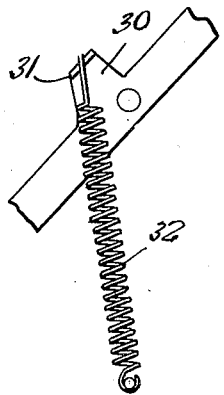

Patented Aug. 31, 1926.

1,598,499

UNITED STATES PATENT OFFICE.

JAMES L. PARKER, OF SIMMONS, MISSOURI.

EDUCATIONAL DEVICE.

Application filed January 11, 1926. Serial No. 80,567.

This invention relates to educational devices, and has more particular reference to a device that is especially, but not specifically adapted for the instruction of children or even grown ups in the study of geography and the like.

The primary object of the invention is to provide such a device wherein geography, topography, etc., etc., may be taught through visionary means rather than by statement of fact, it being of course well known that representations are more readily retained in the mind of a student than are statements explaining said representations.

With this end in view I have shown and will hereinafter more fully describe a specific embodiment of the invention that comprises a highly novel, simple, and extremely interestingly operable mechanism of such a nature that will permit of contests between two or more persons, the device shown and hereinafter described being specifically adapted for use in the study or instruction in geography.

In the drawing wherein like reference characters indicate corresponding parts throughout the several views, and wherein there is disclosed a single embodiment of the invention:

Figure 3 is a detail vertical section.

Figure 1:
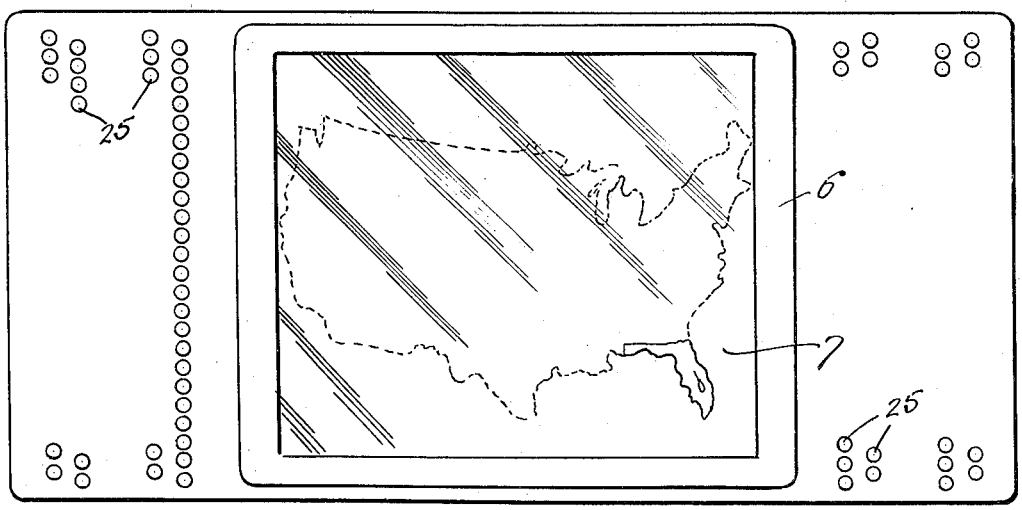
Figure 1 is a top plan view of the device.
Figure 2:
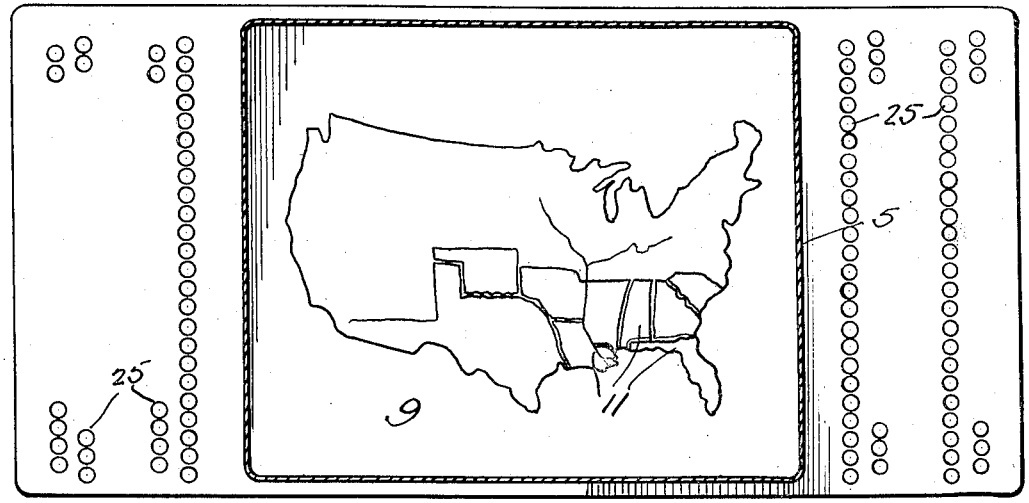
Figure 2 is a detail longitudinal section thereof.

Figure 4 is an elevation disclosing fragmentarily in two positions the lower end of one of the vertically movable preformed plate-carrying bars that constitutes a most essential part of the present invention, and Figure 5 is a fragmentary side elevation disclosing more in detail a portion of a cooperating lever through the medium of which the cooperating bar just mentioned is moved in opposite vertical positions.

Now having particular reference to the drawings, my novel educational device constitutes the provision of a hollow casing 5 preferably of square shape in cross section, though it is not necessary that said casing be of this particular shape.

The upper end of the casing 5 is open and is adapted to have disposed thereon in a detachable manner a window carrying frame 6 within which is a pair of face to face contacting window panes 7 and 8 respectively. The lower glass 8 is colored, and has etched thereon in the present instance the map of the United States of America, including all the names of all the States, the capitals thereof, the principal rivers, the names of other rivers, towns, and counties, the size of the glass plate of course determining the size of the map and the amount of indicia that may be etched in the formation of the map.

Within the casing 5 and extending horizontally there-across is a pair of spaced walls 9—9 that are provided with a plurality of registering openings, in the present instance 48, and vertically slidable through the openings, in this instance only one opening being shown in each plate which is sufficient for illustration purposes, are bars, one of which is shown in Figure 3, the same designated by the reference character 10.

Upon the upper ends of said bars are blocks 11 of a shape consonant with the outline of the particular space of the map etched upon the glass 8, said block being directly beneath the respective spaced outlines of said map, said blocks being of a color similar to the color of the map carrying plate 8.

It may be well to herein state that located within the casing 5 above the walls 9—9 is one or more electric lamps 12 receiving current from a source of suitable supply, the lamps being located at the sides of the casing so as not to be interfered with by the blocks 11 moving upwardly and downwardly therein. It may also be well to state at this point that the blocks 11 are normally adapted to be disposed in a position directly beneath the window comprising the panes 7 and 8 in order that the light rays from the lamp shall not project onto the window, or at least that portion of the same carrying the etched map for thus preventing the same from being viewed by the student.

Means is provided for raising or lowering any predetermined one of the blocks 11, and also means is provided for maintaining the blocks in their upwardly extended positions or in a downwardly extended position for thus allowing the outline of the particular State to be traced by the finger or a pencil carried by the student, or otherwise permitting free usage of the hand during study of the map. As I have hereinbefore stated but a single one of the State outline blocks is shown and consequently a single mechanism is disclosed whereby the blocks may be raised by the students at opposite sides of the device, the mechanism being also operable for permitting of the reverse movement of the block. It is nevertheless to be understood that even though I have disclosed but a single operating mechanism for the single State outline block, it is nevertheless to be understood that similar mechanism is employed for raising and lowering the blocks representative of the forty-eight States of the United States of America, and according to the position of the State outline block within the casing, the units comprising the mechanism must be properly arranged to meet the conditions.

The State outline block operating mechanism disclosed in the drawing, is housed within the lower portion of the casing 5 and within housings 14 and 15 at diametrically opposed sides of said casing.

For accommodating each State outline block carrying bar 10 with respect to the operating mechanism, the lower end of said bar, as more clearly shown in the views of Figure 4 is mortised at opposite sides along one side of which is adapted to extend in one instance the lower end of a lever 16 and in the other instance a lever 17. Passing through the upper end of the mortised portion of said bar 10 is pin 18 upon the opposite ends of which are anti-friction rollers 19 in order that the levers 16 and 17 which are in some instances adapted to be swung upwardly will not frictionally engage the bar at the upper end of its mortised portion. At the lower end of the mortises, the bar is rounded as at 20 for similar anti-friction purposes.

In the instance shown, the bar 16 is pivoted adjacent its outer end as at 21 within a vertical slot 22 in the adjacent side wall of the casing 5. The extreme end of the lever 16 is pivoted as at 23 on the lower end of a rod 24 that extends upwardly through an opening in the top wall of the housing 5 and is equipped with a finger or thumb operating key 25.

Also connected to the lower end of the rod 24 is a connecting link 26 which is pivotally connected adjacent its opposite end to a link 27 that is in turn pivotally connected at its lower end as at 28 to the bottom wall of said housing 15. The extreme end of the link 26 is pivoted to the lower end of a rod 29 that also extends upwardly through an opening in the top wall of the housing 15 directly rearwardly of the opening through which projects the rod 24, it being obvious that the link connection 26 between the lower ends of said rods will effect the upward movement of one rod during the reverse movement of the other rod and vice versa.

At the inner side of the pivotal connection 21 between the lever 16 and the adjacent wall of the casing 5 said lever is formed upon its top edge just inwardly of said pivotal connection with a substantially right angular ear 30, the upper end of which is bent at right angles thereto for providing an attaching lug 31 for one end of a retractile coil spring 32, the other end of which is rigidly secured within the wall slot 22 beneath the pivotal connection 21, Figures 3 and 5.

It will be obvious that when the State block 11 and its carrying bar 10 is in the position shown in Figure 3, the operating mechanism therefor will be in the same position, the rod 24 thereof upwardly the rod 29 downwardly as shown. By pressing the rod 24 downwardly the lever 16 will be swung upon its pivot and moved into the dotted line position shown for obviously moving the State outline block carrying bar 10 upwardly into the dotted line position also shown which is the position directly beneath the map carrying window in the upper end of the frame. During the pivotal movement of the lever 16 the spring 32 will be thrown over to the opposite side of the pivot 21 for thus maintaining said lever in the bar upwardly held position. The downward movement of the rod 24 will occasion the upward movement of the rod 29. When it is desired to lower the block 11 this rod 29 is depressed for reversing the movement of the lever and bar in which position the same will be held by said spring 32 which is again thrown over to the full line position of Figure 3.

The lever 17 extends in a direction opposite to the lever 16 and is pivoted adjacent its end as at 33 within a slot 34 in the adjacent side wall of the casing 5. In this instance also the extreme end of the lever 17 is pivotally connected to the lower end of a rod 24' which extends upwardly and passes through an opening in the top wall of the housing 14, the lower end of said rod being pivotally connected also to a link 26' which is interconnected at its opposite end in a pivotal manner to a rod 29', said link 29 being pivotally secured adjacent its outer end to the upper end of a pivotal link 27'. Obviously the actuating of the rod at one side of the device will effect a movement of the similar rod at the opposite sides of the device, the dual operating means permitting the operation of the different main outline blocks, by students upon opposite sides of the device who may if desirable engage in a contest in the actuation of the block into position for permitting a particular State to be viewed by the action of the light rays passing therethrough when the block is lowered or in setting off the light to the particular State by moving the block in a reverse direction.

In some instances the mechanism for actuating the State outline blocks must be reverse to that shown in the figure, while also the length of the levers 16 and 17 for operation of the other State outline blocks must be of various lengths complementary to the bar of the particular block.

It will thus be seen that I have provided a highly novel, simple, and interesting form of educational device that is well adapted for all the purposes herein designated, even though I have shown and described one embodiment of the invention, and it is to be understood that I do not desire to be limited to such, in the future practice of the invention, since modifications may be had for the instruction of other study without departing from the spirit and scope of the appended claims.

Having thus described the invention, what I claim as new and desire to secure by Letters Patent is:

1. In an educational device of the character described, a casing being open at one side, and having a translucent plate therein upon which is formed a pre-determined design, illuminating means within the casing and means whereby all or a predetermined portion of the said design may be covered to prevent the passage of the light rays therethrough, said means comprising a plurality of interfitting blocks of predetermined shape that when interfitted are complementary to the design.

2. In an educational device of the character described, a casing open at one side and having disposed therein a translucent plate upon which is formed a predetermined design, illuminating means within the casing and means whereby the light rays from the illuminating means may be cut off from all or any predetermined portion of the design, said means comprising a plurality of interfitting blocks of predetermined shape that when interfitted are complementary to the design.

3. In an educational device of the character described, a casing open at one side, and having a translucent plate therein upon which is formed a predetermined design, illuminating means within the casing and means whereby all or a predetermined portion of the said design may be covered to prevent the passage of the light rays therethrough, said means comprising a plurality of interfitting blocks of predetermined shape that when interfitted are complementary to the design, and means at one side of the casing whereby said block may be raised above and below the illuminating means.

4. In an educational device of the character described, a casing open at one side and having disposed therein a translucent plate upon which is formed a predetermined design, illuminating means within the casing and means whereby the light rays from the illuminating means may be cut out off from all or any predetermined portion of the design, said means comprising a plurality of interfitting blocks of predetermined shape that when interfitted are complementary to the design, and means at one side of the casing whereby said block may be raised above and below the illuminating means.

5. In an educational device of the class described, a casing open at its top, a translucent plate supported in the open top of the casing and having a predetermined design formed thereon, illuminating means within the casing whereby the light rays therefrom will illuminate the design, and means normally disposed below the illuminating means and adapted to be raised upwardly in the casing to contact with the bottom of the translucent plate to prevent the portion of the design cover being illuminated.

6. In an educational device of the class described, a casing open at its top, a translucent plate mounted in the open top of the casing and having a predetermined design formed thereon, illuminating means within the casing whereby the light rays therefrom will illuminate said design, means whereby all or a portion of the design may be covered to prevent the passage of the light rays therethrough, said means comprising a plurality of blocks which when arranged in interfitting relation are of a design complemental to the design on the translucent plate, said blocks being normally disposed below the illuminating means, and adapted to be raised upwardly in the casing to contact with the bottom of the translucent plate.

7. In an educational device of the class described, a casing open at its top, a translucent plate mounted in the open top of the casing and having a predetermined design formed thereon, illuminating means within the casing whereby the light rays therefrom will illuminate said design, means whereby all or a portion of the design may be covered to prevent the passage of the light rays therethrough, said means comprising a plurality of blocks which when arranged in interfitting relation are of a design complemental to the design on the translucent plate, said blocks being normally disposed below the illuminating means and adapted to be raised upwardly in the casing to contact with the bottom of the translucent plate, a plurality of vertically movable rods, said blocks being carried on the upper ends of the respective rods, and means at the sides of the casing for actuating said rods.

8. In an educational device of the class described, a casing open at its top, a translucent plate mounted in the open top of the casing and having a predetermined design formed thereon, illuminating means within the casing whereby the light rays therefrom will illuminate said design, means whereby all or a portion of the design may be covered to prevent the passage of the light rays therethrough, said means comprising a plurality of blocks which when arranged in interfitting relation are of a design complemental to the design on the translucent plate, said blocks being normally disposed below the illuminating means and adapted to be raised upwardly in the casing to contact with the bottom of the translucent plate, a plurality of vertically movable rods, said rods being carried on the upper ends of the respective rods, means at the sides of the casing for actuating said rods, said last mentioned means comprising a link pivotally supported intermediate its ends through the side of the casing, the inner end of the link being operatively connected with the lower end of each rod, and a manually actuated lever connected with the outer end of said link.

9. In an educational device of the class described, a casing open at its top, a translucent plate mounted in the open top of the casing and having a predetermined design formed thereon, illuminating means within the casing whereby the light rays therefrom will illuminate said design, means whereby all or a portion of the design may be covered to prevent the passage of the light rays therethrough, said means comprising a plurality of blocks which when arranged in interfitting relation are of a design complemental to the design on the translucent plate, said blocks being normally disposed below the illuminating means and adapted to be raised upwardly in the casing to contact with the bottom of the translucent plate, a plurality of vertically movable rods, said rods being carried on the upper ends of the respective rods, means at the sides of the casing for actuating said rods, said last mentioned means comprising a link pivotally supported intermediate its ends through the side of the casing, the inner end of the link being operatively connected with the lower end of each rod, a manually actuated lever connected with the outer end of said link, and means for holding the rods and the respective blocks in a raised position.

In testimony whereof I affix my signature.

JAMES L. PARKER.